Jan. 9, 1934.  E. K. DEGENER  1,942,746

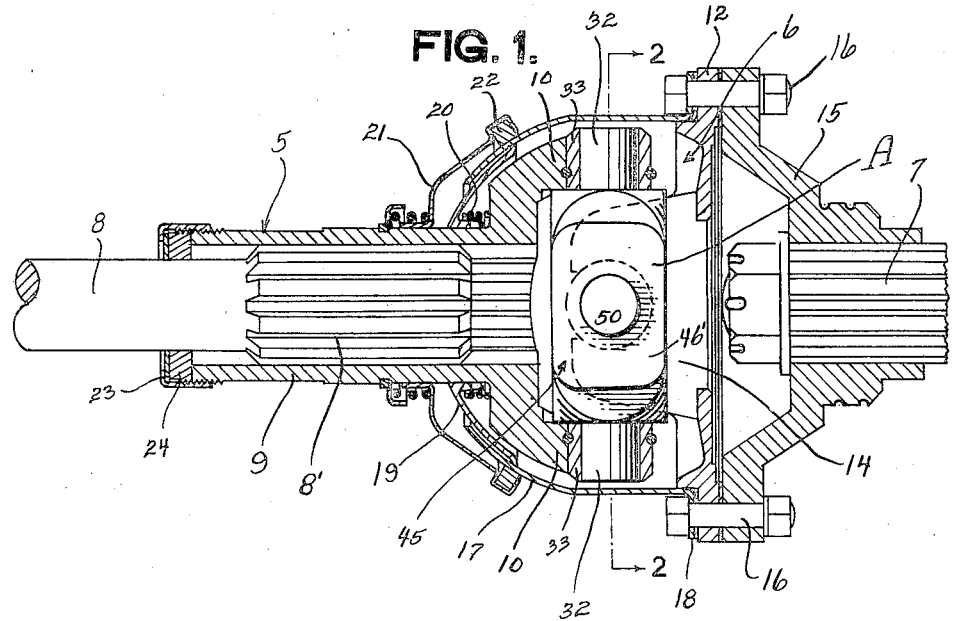

TORSIONAL CROSS JOINT

Filed Feb. 18, 1932  2 Sheets-Sheet 2

INVENTOR.
Edward K. Degener

BY Lancaster, Allwine and Rommel
ATTORNEYS.

Patented Jan. 9, 1934

1,942,746

UNITED STATES PATENT OFFICE 1,942,746

TORSIONAL CROSS JOINT

Edward K. Degener, Los Angeles, Calif.

Application February 18, 1932. Serial No. 593,910

9 Claims. (Cl. 64—102)

The present invention relates to universal joints and the primary object of the invention is to provide improved torque cushioning means for universal joints of that type employing a cross to provide a driving connection between two rotary shafts.

A further object of the invention is to provide a torsional cross primarily intended for use in a universal joint assembly adapted for use in the drive line of motor vehicles for cushioning the driving shock and relieving strain on the differential and transmission gears and yet providing for a positive driving connection between the gears.

A further object of the invention is to provide a flexible torsional cross joint for universal joints wherein back lash is eliminated and a cushioning action provided between the drive and driven shafts to dampen any vibration that may develop in the drive line.

A further object of the invention is to provide a torsional cross which is strong and durable in construction and may be readily applied to universal joints of the character employing a cross forming a coupling between two yoke members.

A still further object of the invention is to provide a flexible torsional cross embodying yieldable trunnions returnable to a normal position upon release of the torsional strain on the shaft.

Other objects and advantages of the invention will be apparent during the course of the following detailed description, taken in connection with the accompanying drawings forming a part of this specification and in which drawings:—

Figure 1 is a longitudinal sectional view thru a universal joint assembly of the double Y type provided with the improved torsional cross.

Figure 2 is a sectional view on line 2—2 of Figure 1, the joint having been given a one-quarter turn from the showing in Figure 1.

Figure 3 is a sectional view similar to Figure 2 but showing the position of parts when the torsional cross is distorted by the turning torque.

Figure 4:
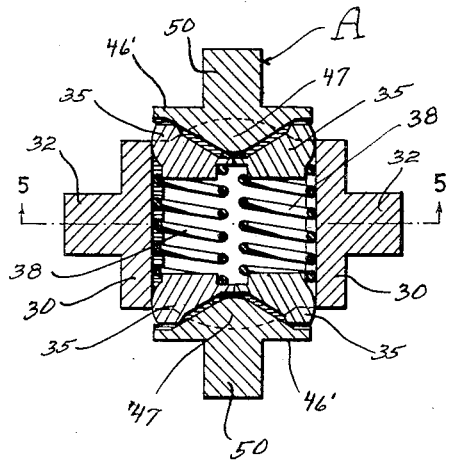
Figure 4 is a sectional view thru the torsional cross.
Figure 5:
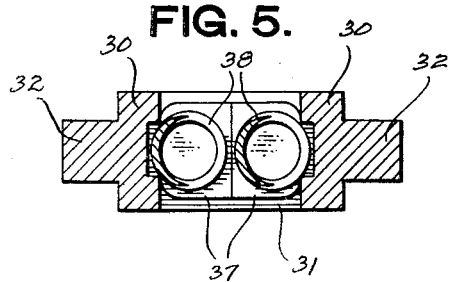
Figure 5 is a section on the line 5—5 of Figure 4.
Figure 6:
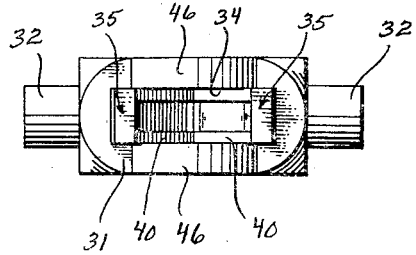
Figure 6 is an edge elevation of the cross showing one of the cushioning trunnion members removed.
Figure 7:
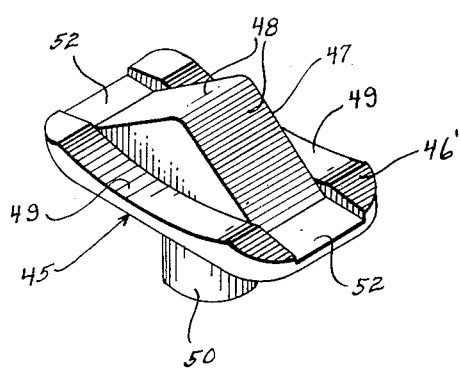
Figure 7 is a perspective view looking at the inner side of one of the trunnion members.
Figure 8:
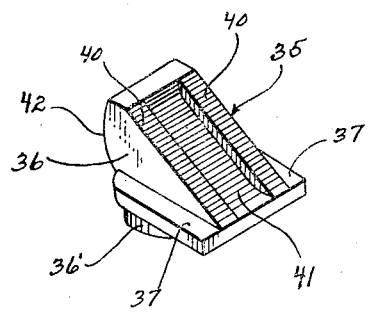
Figure 8 is a perspective view looking at the outer side of one of the yieldable spring members.

Referring to the drawings in detail wherein similar reference characters designate corresponding parts thruout the several views, the improved torsional cross A has been shown applied to a conventional type of universal joint normally provided with a solid cross providing a flexible coupling between a pair of shafts.

The joint assembly comprises a pair of yokes 5 and 6 connected by the torsional cross or torque cushioning means A for imparting rotation from the shaft 7 to the shaft 8 or vice versa. In the example illustrated the shaft 7, may form the stub shaft of a motor vehicle transmission while the shaft 8 may form a propeller shaft for connection to the differential gearing of the vehicle. The yoke 5 embodies a sleeve portion 9 which is internally splined for receiving the splined end portion 8' of the driven shaft 8. Provided at the inner end of the sleeve portion 9 are the usual yoke arms 10 provided with parallel confronting bearing surfaces 11.

The yoke member 6 comprises the usual ring flange 12 provided with the yoke arms 14 arranged at a right angle to the yoke arms 10. In the conventional type of universal joint assemblies, the yoke arms 10 and 14 are connected by a solid cross preventing relative circumferential movement of the yokes 5 and 6.

The yoke 6 is connected by the ring flange 12 to an attaching or coupling plate 15 by suitable bolts 16, the coupling plate having a sleeve portion for receiving the splined drive shaft 7.

The usual joint assembly also includes an oil tight casing or housing adapted to enclose the movable parts of the joint for insuring proper lubrication thereof and in the example illustrated comprises a main casing section 17 of substantially tubular formation and having an outturned flange 18 at one end for attachment to the ring flange 12 by the bolts 16. The opposite end of the casing section 17 is spherically curved and telescopically overlaps a spherically curved minor casing section 19 encircling the sleeve 9 and normally urged into engagement with the casing section 17 by the coil spring 20. Encircling the sleeve 9 is a shield 21 which is spring urged towards the casing section 17 and is provided with a sealing packing ring 22. Threaded over the end of the sleeve 9 is a grease cup containing a packing ring 24 serving to prevent passage of lubricant from the enclosed joint assembly.

Referring now to the improved torsional cross joint providing a circumferentially yieldable driving connection between the yokes 5 and 6, the same comprises a hollow trunnion block of substantially rectangular shape in plan providing parallel end walls 30 and side walls 31. Formed integral with the end walls 30 are the axially aligning trunnions 32 rotatably mounted in the yoke arms 10 as by the usual bearing sleeves 33. The end walls 30 have bearing engagement with the bearing surfaces 11 of the arms 10 to prevent movement of the trunnion blocks axially of the trunnions 32.

Provided in each of the side walls 31 is a rectangular shaped guide opening 34 in each of which is mounted a companion pair of spring seat members 35. The four spring seat members 35 are all of like construction and each embodies a wedge-shaped body portion 36 having parallel side walls slidably engaging the side surfaces of the guide openings 34. Formed at the inner edge of the body portion 36 along each side thereof are stop flanges 37 which engage the inner surface of the side walls 31 and limit outward movement of the spring seat members thru the guide openings 34. Acting between the seat members 35 arranged in the guide openings 34 is a pair of expansion coil springs 38 which normally urge their respective seat members away from one another and the stop flanges 37 into engagement with the side walls 31 of the trunnion block. The wedge-shaped body portions 36 provide inclined bearing surfaces 40 having a channel 41 for reducing friction and insuring better lubrication. The body portions 36 are provided with arcuate end surfaces 42 for engagement with the ends of the guide openings 34.

The seat members 35 when assembled in the guide openings 34 provide substantially V-shaped seats engageable by the cushioning trunnion members 45. Each of the side walls 31 of the trunnion block is provided along each side of its guide opening 34 with a convex projection 46 providing arcuate bearing surfaces for the trunnion members 45. These arcuate bearing surfaces are struck from a center forming the axis of the hollow trunnion block and terminate inwardly of the ends of the guide openings.

The cushion members 45 are each formed with a plate portion 46' provided at its inner side with a V-shaped shoe portion 47 having angular bearing surfaces 48 terminating short of the ends of the plate portion and parallel side walls arranged inwardly of the side edges of the plate portion. Provided at the inner side of the plate portion 46' at each side of the shoe portion 47 are concaved bearing surfaces 49 which bear upon the arcuate bearing surfaces of the convex projections 46 while the angular bearing surfaces 48 engage upon the inclined bearing surfaces 40 of the spring seat members 35. The width of the shoe portions 47 between their parallel side walls is equal to the width of the guide openings 34 into which the shoe portions project for bearing contact with the spring seat members.

Formed integral with the plate portions 46' are trunnions 50 which are intended to be rotatably mounted in the yoke arms 14 by the usual bearing sleeves 33'. The flat outer surfaces of the plate portions 46 have bearing contact with the flat bearing surfaces 11' of the yoke arms 14 whereby the plate portions are held in bearing contact with the side walls of the trunnion block and the spring seat members 35. The plate portions 46' beyond the ends of the bearing surfaces 48 may be grooved as at 52 to allow for ready passage of lubricant to the bearing surfaces 48. The projecting ends of the plate portions 46' act to limit distortion of the torsional cross beyond given limits by engagement of the end portions with the side walls of the trunnion block.

The springs 38 are of such strength as to normally retain the trunnions 50 in right angular relation to the trunnions 32 during normal drive between the shafts 7 and 8. By providing the stop flanges 37 for the spring seat members, the spring seat members and their springs 38 may be assembled in the trunnion block and held against displacement during attachment of the torsional cross to the yokes 5 and 6.

In use, when the driving effort of the shaft 7 exceeds the turning strain of the shaft 8, the torsional cross will be distorted in a manner as shown in Figure 3 and relieve any shock being transmitted to the shaft 8. This cushioning of the driving shock is accomplished thru engagement of the V-shaped shoe portions 47 with the spring seat members 35 causing a compression of both of the springs 38 and allowing the trunnions 50 to move to positions out of right angular relation to the trunnions 32. It will be noted from Figure 3 that during this movement, the trunnions 50 are retained in axial alignment and without any shifting strain upon the trunnions or the yoke arms 14. The seat members 35 may be provided with suitable extensions 36' which project into the ends of the coil springs 36 for preventing displacement of the springs.

The construction of the torsional cross is such as to permit ready and easy renewing of parts and assembling of the torsional cross in universal joint assemblies of the conventional type employing a solid cross. While the device has been described for use in a universal joint assembly for motor vehicles, it will be readily understood that the torsional cross may be equally well applied to universal joints for other purposes and providing a flexible connection between shaft ends.

Changes in detail may be made to the form of invention herein shown and described, without departing from the spirit of the invention or the scope of the following claims.

I claim:

1. In a flexible coupling, a pair of yoke members, and torque cushioning means between the members comprising a cross member having fixed trunnions mounted in one of the yoke members and cushioning trunnion members mounted in the companion yoke member and yieldable in either direction of rotation of the yoke members.

2. In a universal joint embodying a pair of yoke members, a torsional cross connecting the yoke members embodying fixed trunnions and cushioning trunnions yieldable with respect to the fixed trunnions in the direction of rotation of the cross.

3. In a universal joint embodying a pair of trunnion receiving yokes for connection to shaft ends, torque cushioning means including a pair of connected trunnions mounted in one of the yoke members and a pair of cushioning trunnions mounted in the companion yoke member and yieldably held in right angular relation to the connected trunnions.

4. In a universal joint, a pair of yoke members, and a torque cushioning cross for the yoke members comprising a trunnion block having fixed trunnions mounted in one of the yoke members, movable cushioning members having trunnions mounted in the companion yoke member, and spring means acting upon the cushioning members for normally retaining them in right angular relation to the fixed trunnions.

5. In a universal joint, a pair of yoke members, and a torsional cross connecting the yoke members comprising a hollow trunnion block having a trunnion at each end thereof for mounting in one of the yoke members, a cushioning member movably mounted at each side of the block and having trunnions for mounting in the companion yoke member, a pair of spring seat members for each cushioning member, and spring means acting upon the seat members for normally retaining the trunnions of the cushioning members in right angular relation to the trunnions of the trunnion block.

6. In a torsional cross for universal joints, the combination of a hollow trunnion block, fixed trunnions at the ends of the block, a pair of bearing members guided in each side of the block and having inclined bearing surfaces providing V-like seats, coil springs normally urging the bearing members outwardly, and a cushioning trunnion member for each pair of bearing members, each embodying a trunnion and a V-like shoe portion engaging upon said seats.

7. In a torsional cross for universal joints, the combination of a hollow cross block providing end and side walls, axially aligning trunnions integral with the end walls, a pair of bearing members slidably guided in each of the side walls and having inclined outer bearing surfaces, an expansion coil spring arranged between each companion set of bearing members to normally urge the members outwardly, and a cushioning member for each pair of bearing members, each including a trunnion and a shoe portion having inclined surfaces for sliding contact with the inclined bearing surfaces of their respective bearing members.

8. In a torsional cross of the class described, a hollow trunnion block providing end and side walls, said side walls each having a guide opening, a trunnion carried by each end wall, a pair of bearing members slidably guided in each of said guide openings and having inclined outer surfaces, said pairs of bearing members being arranged with inclined surfaces converging towards the axial center of the block, a pair of expansion coil springs arranged in the hollow block between companion sets of the bearing members, and a cushioning member for each pair of bearing members, each including a trunnion and a V-like shoe portion providing angular bearing surfaces for contact with the inclined outer surfaces of their respective bearing members.

9. A torsional cross of the class described comprising a hollow trunnion block providing end and side walls, said side walls each having a guide opening, a convex projection along each side of each guide opening and providing arcuate bearing surfaces concentric with the axis of the block, a trunnion carried by each end wall, a pair of bearing members slidably guided in each of said guide openings and having inclined outer surfaces, said pairs of bearing members being arranged with their inclined surfaces converging towards the axial center of the block, an expansion coil spring arranged between companion sets of the bearing members, and a cushioning member for each pair of bearing members, each including a trunnion, a plate portion overlying the convex projections and a V-like shoe portion extending between the projections and providing angular bearing surfaces for contact with the inclined outer surfaces of their respective bearing members, said plate portions at each side of the shoe portions having concaved surfaces for bearing engagement upon the arcuate bearing surfaces of the convex projections.

EDWARD K. DEGENER.